United States Patent Office 2,830,880
Patented Apr. 15, 1958

2,830,880

CATALYTIC TREATMENT OF SULFUR-CONTAMINATED HYDROCARBONS FOR THE PRODUCTION OF HYDROGEN

James H. Shapleigh, Wilmington, Del., assignor to Hercules Powder Company, Wilmington, Del., a corporation of Delaware No Drawing. Application December 24, 1954
Serial No. 477,593

8 Claims. (Cl. 23—212)

This invention relates to the catalytic treatment of hydrocarbons and more particularly to a process for the catalytic treatment of fluid hydrocarbons containing at least 25 grains per 100 cu. ft. of gaseous hydrocarbon.

At the present time tremendous quantities of industrial hydrogen are produced by the catalytic reformation or cracking of fluid hydrocarbons. Metals of the iron group are normally employed as catalysts and, of all catalytic agents currently known for catalytic production of hydrogen from hydrocarbons, nickel is the most active and most desirable. Regrettably, however, this active nickel catalyst is seriously affected by sulfur with the result that when the hydrocarbon feed contains more than about 0.5 grain of sulfur, cracking efficiencies rapidly diminish due to the poisoning effect of the sulfur on the nickel catalyst.

Those engaged in the catalytic hydrogenation and dehydrogenation of hydrocarbons have spent large sums of money endeavoring to develop either a process which will efficiently handle sulfur-containing hydrocarbons or else a sulfur-resistant catalyst. The problem has been so intense that a group of major hydrocarbon cracking organizations pooled research money to finance an organized program aimed to the development of a sulfur-resistant catalyst. This program met with very limited success. As a result, it has been and is now the standard procedure in the art to remove, at considerable expense, sulfur from a hydrocarbon feed before passing it over nickel catalyst.

In U. S. Patent 2,628,890 it is disclosed that improved performance may be obtained with sulfur-polluted hydrocarbons containing more than 0.5 grain of sulfur per 100 cu. ft. of gaseous hydrocarbon by employing a catalyst containing at least 10% nickel which is maintained at least in part at a temperature of at least 900° C. While this process has constituted a very desirable improvement in the art and has enabled the art to employ sulfur-polluted hydrocarbons without costly sulfur removal steps, it is nevertheless a fact that for various reasons it would be desirable to escape the necessity of employing temperatures of 900° C. and above in cracking reactions because of the presence of sulfur.

With regard to sulfur-resistant catalyst, some progress has recently been made through the development of the zirconium-silicon-magnesia-nickel catalyst disclosed in U. S. 2,639,223. This catalyst, when employed in the high temperature process of U. S. 2,628,890, produces excellent results. However, as indicated, additional improvement would be obtained by a process using nickel catalyst which did not require the compulsory use of temperatures substantially greater than those necessary with gaseous, sulfur-free hydrocarbons containing less than about 0.5 grain per 100 cu. ft. of hydrocarbon. Particularly desirable is an economical process for treatment of hydrocarbon containing 25 grains or more of sulfur per 100 cu. ft. of originally gaseous or subsequently gasified hydrocarbon.

Another age old nemesis in the hydrocarbon cracking art has been the deposition of elemental carbon during the cracking process. Substantial strides have been made in the development of methods free from detrimental carbon in processes employing sulfur-free feedstock. These processes generally rely on improved furnacing as in Reissue Patent 21,521 and on injection systems which substantially completely prevent the formation of elemental carbon during preheating of the hydrocarbon to substantially cracking temperature as in U. S. 2,524,840 and U. S. 2,525,276. However, with sulfur-containing hydrocarbons, particularly those containing appreciable amounts of unsaturates, these improvements are not completely effective, since the improved furnacing and the improved injection systems are unable to compensate in all respects for direct and indirect effects due to use of nickel catalyst with these materials. Consequently, when the catalyst becomes less efficient, the delicate balance of the cracking reaction is overthrown to the extent that considerable elemental carbon is obtained, particularly in the cracking of oils. The effect of this carbon in plugging up the catalyst bed and in increasing pressure drop is a well-known and a serious obstacle to industrial usage and it is the practice of the art, wherever such carbonization is obtained, to periodically purge the bed to remove the elemental carbon.

While it has been understood by the prior art that nickel catalyst may actually accelerate carbon deposition, it has apparently never been appreciated that even after a steam purge a residual effect is evidenced in terms of reduction in catalytic activity through formation of nickel carbide. Thus, under specific reaction conditions existing in the cracking of the higher hydrocarbons, and particularly the sulfur-contaminated, normally liquid hydrocarbons, the result of carbonization is not limited to a physical covering up of catalyst which can be alleviated by removing elemental carbon. Instead, nickel carbide is formed along with nickel sulfide and contributes to the reduced catalyst activity. Thus, to improve the performance of nickel catalyst when treating these highly desirable feedstocks, it is necessary to remove or minimize the poisoning effects of both sulfur and carbon.

Now in accordance with the present invention, a process has been developed which permits the cracking of fluid hydrocarbons in their unpurified state irrespective of the amount of sulfur they contain without the necessity of employing excessively high catalyst temperatures. This process not only minimizes the effect of poisoning of nickel catalyst by sulfur but also prevents the formation of detrimental amounts of elemental carbon and nickel carbide and their resulting physical and chemical effects on the efficiencies of the catalyst bed.

Generally described, the present invention is a process for producing hydrogen from sulfur-contaminated hydrocarbons, wherein chemical poisoning of nickel catalyst by sulfur and carbon is minimized, which comprises passing a mixture of an oxidizing gas and a fluid hydrocarbon containing at least 25 grains of sulfur per 100 cu. ft. of gaseous hydrocarbon into contact with a nickel catalyst in the presence of at least 60 moles of hydrogen to each mole of sulfur (expressed as $H_2S$) at initial catalyst contact and maintaining the catalyst at initial contact at a temperature of between 1000° and 1500° F. Preferably, the temperature of the catalytic mass will be maintained at an increasing temperature gradient with the highest temperatures being present near the downstream portion of the catalyst bed. The 1000°–1500° F. temperature will be maintained at the upper portion of the catalyst bed in order that the hydrogen-containing feed will initially contact catalyst heated to this temperature.

The hydrogen in the feedstock may be introduced in any desirable manner. For example, a layer of sulfur-resistant catalyst may be disposed upstream in the system from the nickel catalyst and a partial cracking may be effected to produce the necessary amount of hydrogen prior to contact with the nickel catalyst. Alternatively, the sulfur-contaminated fluid hydrocarbon may be passed through a thermal reaction zone to effect a thermal cracking which will produce the necessary amount of hydrogen in the feed prior to contacting the nickel catalyst. The hydrogen may be introduced in yet another manner by recycling the necessary amount of effluent to obtain the necessary amount of hydrogen in the feed prior to contact with the nickel catalyst, which effluent may be partly or wholly desulfurized prior to recycling.

Novelty per se is not claimed in this invention for passing a mixture of hydrocarbon and hydrogen into contact with a nickel catalyst. Novelty is claimed, however, for passing a sulfur-contaminated hydrocarbon containing at least 25 grains of sulfur per 100 cu. ft. of hydrocarbon and at least 60 moles of hydrogen per mole of sulfur (expressed as $H_2S$) into contact with a nickel catalyst. In the prior art, hydrogen has been present in admixture with sulfur-free hydrocarbon or hydrocarbon containing insignificant amounts of sulfur for various purposes. For example, in partial oxidation reactions some hydrogen has been added to a hydrocarbon feed to react with the oxygen and thus prevent oxidation of the catalyst and resultant loss in cracking efficiency. It is also known to admix purge gases from an ammonia synthesis unit with fresh hydrocarbon and steam introduced to a reforming unit in order to reclaim residual methane which would otherwise be purged to the atmosphere. Hydrocarbon oils have also been desulfurized in an initial step by contacting a sulfur-resistant catalyst such as molybdenum oxide with the hydrocarbon in the presence of hydrogen to form hydrogen sulfide. The hydrogen sulfide formed is then removed by conventional scrubbing steps and the sulfur-free hydrocarbon is then passed into contact with nickel cracking catalyst. In all of these processes, however, the art has either employed sulfur-free feed, that is, stock which contains no sulfur whatsoever or else amounts less than 0.5 grain which can be tolerated, or else has taught complete removal of the sulfur or its reduction to the tolerable level prior to contacting nickel catalyst. Such disclosures and teachings are the exact opposite of the present invention where sulfur-polluted hydrocarbons containing from 25 grains of sulfur up to and beyond as much as 5% of sulfur, are intentionally passed over a sulfur-sensitive nickel catalyst in admixture with at least the specified minimum molar ratio of hydrogen.

While it is not desired to be bound by the theory behind the success of the present invention in substantial elimination of poisoning of nickel catalyst, it is believed that the sulfur in the gaseous or gasified hydrocarbon is held in a critical relationship between nickel and hydrogen sulfide during a critical period of initial catalyst contact. In accordance with the process of the invention wherein the specified ratio between hydrogen and sulfur is maintained and the recited temperatures are employed, the prior art conditions favorable to immediate poisoning of catalyst at initial contact are avoided.

It is realized that in the prior art there has been some discussion with regard to sulfur poisoning being due to the formation of a nickel-sulfur compound or complex and that where portions of the catalyst are not detrimentally affected it has naturally been assumed by some that equilibrium conditions of some sort existed in favor of unpoisoned nickel or nickel oxide. However, this theory has been generally rejected since ample quantities of hydrogen are formed in the reaction, as indicated by the effluent, to compensate for sulfur content of the feed. In fact, the more recent attempts to explain the sulfur poisoning phenomenon have appeared in British publications wherein the position is taken that the metallic nickel, either when supported or in the form of a pelleted catalyst, is actually present in an unorthodox sort of latticelike structure and that the sulfur enters into this lattice and thus prevents the catalyst from exerting its normal activity. The success of the present invention would, however, indicate that sulfur poisoning is due to a normal formation of nickel sulfide and that the solution to the sulfur problem lies in the controlling of conditions in order to upset the normal but undesired equilibrium at the critical point in the reaction and process. It has been discovered in accordance with the present invention that this critical point is the point of initial contact between the sulfur-contaminated hydrocarbon and the nickel catalyst and that thereafter there results a creeping deactivation of catalyst downwardly through the catalyst bed. However, if sufficient hydrogen is intentionally introduced at this stage of the reaction to insure that the sulfur is held in the form of hydrogen sulfide, the nickel itself is left unpoisoned in this critical zone and is free to catalyze the reformation or cracking of the hydrocarbon without creeping catalyst deactivation in a highly efficient manner. It will be understood that while in the foregoing sulfur has been expressed as $H_2S$, organic sulfur is often present in feedstock. The overall effect is nevertheless the same, possibly due in part to temperature desulfurization of the hydrocarbon complex, as in oil, with resultant formation of $H_2S$, and in part to nickel also entering into an equilibrium with organic sulfur.

With respect to carbon poisoning of the nickel catalyst, it is believed that the improved results are possibly due to two principal causes. First, at given reaction conditions the poisoning of nickel catalyst by sulfur lowers its activity and results in deposition of elemental carbon. Thus, when in accordance with the invention the effects of sulfur are minimized, the catalyst is free to operate at normal activity, the carbon normally resulting from reduced activity is not obtained, and the detrimental physical and chemical results of such carbon are avoided. Secondly, in the embodiments of the invention where the required hydrogen is obtained by first passing the stock through a thermal cracking zone or a layer of nonnickel, sulfur-resistant catalyst, the normal accelerated formation of free carbon due to nickel is markedly slowed in relation to the decarbonization effect by steam. Then when the partially cracked mixture does contact nickel catalyst in the specified temperature range, the rate of the steam decarbonization is substantially equal to or exceeds that of the deposition of elemental carbon. Thus, in both instances, chemical carbon poisoning is diminished by minimizing elemental carbon formation in the critical zone where initial contact with nickel catalyst is effected.

Having generally described the invention and its operation, the following examples are presented to illustrate various process embodiments by which the effects of sulfur poisoning and detrimental carbonization may be avoided.

*Example 1*

Sixty pounds per hour of a residual oil containing 1% sulfur (expressed as $H_2S$) is preheated to about 300° F. and partially atomized with steam. The partially atomized mixture is then sprayed into a stream of superheated steam to give a mixture of about 3½ parts hydrocarbon to 1 part steam by weight. The hydrocarbon-steam mixture is heated to a temperature of about 1100° F. and then passed into contact with a body of activated alumina to obtain a partial cracking of the hydrocarbon and a mixture containing about 150 moles of hydrogen per mole of sulfur (expressed as $H_2S$). This mixture is then led into contact with a body of pelleted nickel catalyst containing 25% nickel maintained at a temperature at the point of contact of about 1200° F. to produce an effluent rich in hydrogen.

Example 2

Sixty pounds per hour of a residual oil containing 1% sulfur (expressed as $H_2S$) is preheated to about 300° F. and partially atomized with steam. The partially atomized mixture is then sprayed into a stream of superheated steam to give a mixture of about 3½ parts hydrocarbon to 1 part steam by weight. The hydrocarbon-steam mixture is heated to a temperature of about 1100° F. and then passed into contact with a body of activated alumina to obtain a partial cracking of the hydrocarbon and a mixture containing about 100 moles of hydrogen per mole of sulfur (expressed as $H_2S$). This mixture is then led into contact with a body of pelleted nickel catalyst containing 25% nickel maintained at a temperature at the point of contact of about 1300° F. to produce an effluent rich in hydrogen.

Example 3

Sixty pounds per hour of a residual oil containing 1% sulfur (expressed as $H_2S$) is preheated to about 300° F. and partially atomized with steam. The partially atomized mixture is then sprayed into a stream of superheated steam to give a mixture of about 3½ parts hydrocarbon to 1 part steam by weight. The hydrocarbon-steam mixture is heated to a temperature of about 1100° F. and then passed into contact with a body of activated alumina to obtain a partial cracking of the hydrocarbon and a mixture containing about 50 moles of hydrogen per mole of sulfur (expressed as $H_2S$). This mixture is then led into contact with a body of pelleted nickel catalyst containing 25% nickel maintained at a temperature at the point of contact of about 1500° F. to produce an effluent rich in hydrogen.

Example 4

A mixture of residual oil containing 1% sulfur and steam is formed and partially atomized as in Examples 1-3. The mixture is heated to a temperature of 900° F. and passed into an externally heated, annular open path formed between an outer externally heated stainless steel alloy tube 8 inches in diameter and a concentrically disposed inner tube 7½ inches in diameter to obtain a partial thermal cracking of the hydrocarbon and to produce a mixture containing .0175 mole of sulfur and 1.75 moles of hydrogen. At the termination of the 7½-inch tube the stream is led into contact with a column of nickel catalyst disposed within the outer 8-inch tube. The temperature at the upper level of the catalyst bed is maintained at 1200° F. and gradually increased to 1900° F. adjacent the bottom of the catalyst bed, at which point the effluent is removed and subjected to a hydrogen sulfide removal process.

Example 5

A mixture of substantially sulfur-free natural gas and steam is passed into contact with nickel catalyst to obtain a hydrogen-containing effluent. This effluent is admixed with 60 pounds per hour of a hot vaporized oil containing about 3% sulfur and an additional amount of about 180 pounds per hour of steam to produce a mixture in which the molal ratio between hydrogen and sulfur, expressed as $H_2S$, is 370. The resulting mixture is passed into contact with a nickel-magnesia-zirconia catalyst disposed in a stainless steel tube. The top of the catalyst bed is maintained at a temperature of 1000° F. with an increasing temperature gradient to the bottom of the bed. The hydrogen-rich effluent is removed and subjected to hydrogen sulfide removal steps.

Example 6

A mixture of sulfur-free natural gas and steam is passed into a stainless steel reaction tube into contact with hot catalyst comprising nickel, magnesia, and zirconium silicate to produce a hydrogen-containing effluent. This effluent is then admixed with 2000 cu. ft. per hour of hydrocarbon gas containing 35 grains of sulfur per 100 cu. ft. of gas to produce a total in which the molal ratio of hydrogen to sulfur is about 230. This mixture is then passed into contact with a bed of nickel-magnesia-zirconium silicate catalyst containing 25% nickel. The upper surface of the catalyst bed is maintained at about 1100° F. and an increasing temperature gradient maintained to the bottom of the bed. The hydrogen-containing effluent is removed and subject to hydrogen sulfide removal steps.

Example 7

A mixture of sulfur-free natural gas and steam is passed into contact with heated nickel-alumina catalyst containing 4% nickel to produce a hydrogen-containing effluent. This effluent is admixed with 2000 cu. ft. per hour of a hydrocarbon gas containing 2 grains of sulfur per 100 cu. ft. in an amount to produce a molal ratio of hydrogen to sulfur of 250. The resulting gaseous mixture is passed through a bed of the same catalyst contained within a reaction tube, the upper surface of the catalyst bed being maintained at 1080° F. with an increasing temperature gradient being maintained to the bottom of the bed. The hydrogen-containing effluent is removed and subjected to hydrogen sulfide removal steps.

While the invention is not limited to the type of apparatus or specific process employed in the treatment of sulfur-contaminated hydrocarbons, the tubular process and tubular furnace are preferred due to the enhanced flexibility and control available with such equipment. The preferred tubular apparatus and process is disclosed in U. S. Reissue 21,521 and in copending application Serial No. 476,201, filed December 20, 1954.

In the preferred process the initial hydrogen is produced by passage of the sulfur-contaminated stock over a sulfur-resistant catalyst disposed in the upper portion of the tube. This catalyst may be selected from a number of such catalysts which have been developed by the art and which, while greatly inferior to nickel in catalytic activity, do exhibit sulfur resistance but produce much lower cracking efficiencies and yields. These catalysts include substances such as alumina, zirconia, magnesia, silica, zirconium silicate, copper oxide, vanadium oxide, molybdenum oxide and the like. Preferably, this body of catalyst will be heated to between 1000° F. and 1500° F. and will be used in an amount necessary to give the desired amount of hydrogen. The nickel catalyst will then be disposed in the tube directly below the sulfur-resistant catalyst. It is, of course, not essential that these reactions be carried out in the same apparatus and separate reaction vessels, tubular or otherwise, may be employed.

Where the initial hydrogen in accordance with the invention is obtained by thermal cracking, it is again preferred that a thermal cracking zone be employed in the upper part of the cracking tube and that the tubular process be used. However, other than the tubular process may be used and the two reactions may be carried out in different apparatus. In either event the thermal reaction will generally be carried out with a reaction zone temperature of between 900° F. and 2000° F. In the preferred tubular apparatus it is especially desirable to employ as a thermal reaction zone an annulus formed between the reaction tube and an inner concentrically disposed tube spaced from about ¼ to 1 inch from the inner wall of the reaction tube. Generally, with the above temperature, an annulus of up to about 6 feet in length will produce ample hydrogen for the purposes of the invention. In employing recycled effluent as a source of hydrogen it is desirable that the process be started up by introduction of hydrogen from an independent source until an effluent containing sufficient hydrogen is formed for recirculation thus obviating initial catalyst posioning.

The nickel catalyst employed in the invention may be any of the nickel catalysts known and employed in the art. The catalyst may be a supported catalyst or a pelleted catalyst. Suitable supports include various types of alumina with diaspore being preferred. The preferred pelleted catalyst will comprise from 10–50% nickel in admixture with zirconium silicate and magnesia. Various promoters known to the art may be employed.

The hydrocarbon feed may be chosen from any sulfur-contaminated fluid hydrocarbon, normally gaseous or normally liquid, containing 25 grains and more of sulfur per 100 cu. ft. of gaseous hydrocarbon. By gaseous hydrocarbon is meant a normally gaseous hydrocarbon and normally liquid hydrocarbons which have been vaporized to the gaseous state.

Thus, in accordance with the processes and apparatus disclosed and claimed, it is possible to economically crack sulfur-polluted hydrocarbons which heretofore have been shunned by the art. Since modifications of the invention will become apparent to those skilled in the art, it is intended that the scope of the invention be limited only by the scope of the appended claims.

What I claim and desire to protect by Letters Patent is:

1. A process for producing hydrogen from sulfur-contaminated hydrocarbons, wherein chemical poisoning of nickel catalyst by sulfur and carbon is minimized, which comprises passing a mixture of an oxidizing gas, comprising steam, and a fluid hydrocarbon containing at least 25 grains of sulfur (expressed as $H_2S$) per 100 cubic feet of vaporized hydrocarbon into contact with a nickel catalyst in the presence of at least 60 moles of hydrogen to each mole of sulfur at initial nickel catalyst contact, and maintaining said catalyst at a temperature of between 1000° and 1500° F.

2. A process for producing hydrogen from sulfur-contaminated hydrocarbons, wherein chemical poisoning of nickel catalyst by sulfur and carbon is minimized, which comprises passing a mixture of steam and a fluid hydrocarbon containing at least 25 grains of sulfur (expressed as $H_2S$) per 100 cubic feet of hydrocarbon through an externally heated reaction zone maintained at a temperature of 900° to 2000° F. to produce a partially cracked mixture containing at least 60 moles of hydrogen for each mole of sulfur present in the mixture, and passing the hydrogen-containing effluent over a nickel catalyst maintained at 1000° to 1500° F. at point of initial contact to substantially completely crack the remaining hydrocarbon without detrimental poisoning of the nickel catalyst.

3. A process for producing hydrogen from sulfur-contaminated hydrocarbons, wherein chemical poisoning of nickel catalyst by sulfur and carbon is minimized, which comprises passing a mixture of steam and a fluid hydrocarbon containing at least 25 grains of sulfur (expressed as $H_2S$) per 100 cubic feet of hydrocarbon over a sulfur-resistant catalyst maintained at a temperature of 1000° to 1500° F. to produce a partially cracked mixture containing at least 60 moles of hydrogen for each mole of sulfur present in the mixture, and passing the hydrogen-containing effluent over a nickel catalyst maintained at 1000° to 1500° F. at point of initial contact to substantially completely crack the remaining hydrocarbon without detrimental poisoning of the nickel catalyst.

4. A process for producing hydrogen from sulfur-contaminated hydrocarbons, wherein chemical poisoning of nickel catalyst by sulfur and carbon is minimized, which comprises passing a mixture of steam and a fluid hydrocarbon containing at least 25 grains of sulfur (expressed as $H_2S$) per 100 cubic feet of hydrocarbon over a nickel catalyst maintained at a temperature of at least 1000° to 1500° F. at the point of initial contact, and recycling enough of the resulting effluent as feed in admixture with fresh steam and sulfur-contaminated hydrocarbon to furnish in the admixture at least 60 moles of hydrogen for each mole of sulfur present in the admixture at initial catalyst contact.

5. A process for producing hydrogen from vaporized normally liquid sulfur-contaminated hydrocarbons containing less than 60 moles of hydrogen per mole of sulfur present in the said hydrocarbon, wherein chemical poisoning of nickel catalyst by sulfur and carbon is minimized, which comprises passing a mixture of steam and said vaporized hydrocarbon containing at least 25 grains of sulfur (expressed as $H_2S$) per 100 cubic feet of said hydrocarbon into contact with a nickel catalyst in the presence of at least 60 moles of hydrogen to each mole of sulfur at initial nickel catalyst contact, and maintaining said catalyst at a temperature of between 1000° and 1500° F.

6. A process of claim 5 in which said hydrocarbon is an oil and the said mixture of steam and hydrocarbon is first passed through an externally heated reaction zone maintained at a temperature of 900°–2000° F. to produce a partially cracked mixture containing at least 60 moles of hydrogen for each mole of sulfur present in the mixture, and the hydrogen-containing effluent is then passed over said nickel catalyst maintained in a metallic reaction tube at 1000°–1500° F. at a point of initial contact to substantially completely crack the remaining hydrocarbon.

7. A process of claim 5 in which the mixture of steam and hydrocarbon is first passed over a sulfur-resistant catalyst maintained in an externally heated reaction zone at a temperature of 1000°–1500° F. to produce a partially cracked mixture containing at least 60 moles of hydrogen for each mole of sulfur present in the mixture and the hydrogen-containing effluent is then passed over said nickel catalyst maintained in a metallic reaction tube at 1000°–1500° F. at point of initial contact to substantially completely crack the remaining hydrocarbon.

8. A process of claim 5 in which enough of the resulting effluent is recycled as feed in contact with said nickel catalyst in admixture with said steam and sulfur-contaminated hydrocarbon to furnish in the admixture at least 60 moles of hydrogen for each mole of sulfur present in the admixture at initial catalyst contact.

References Cited in the file of this patent

UNITED STATES PATENTS

| | | |
|---|---|---|
| 1,673,032 | Williams | June 12, 1928 |
| 1,834,115 | Williams | Dec. 1, 1931 |
| 1,915,363 | Hanks et al. | June 27, 1933 |
| 2,273,299 | Szayna | Feb. 17, 1942 |
| 2,642,381 | Dickinson | June 16, 1953 |

OTHER REFERENCES

Riesz et al.: "Catalytic Reforming of Hydrocarbons," American Gas Assn. Monthly, April 1948, pages 17 to 20.